United States Patent [19]

Gleason et al.

[11] Patent Number: 5,032,719
[45] Date of Patent: Jul. 16, 1991

[54] SOURCE RANGE FIELD CALIBRATION FIXTURE

[75] Inventors: Thomas E. Gleason, North Stonington; John E. Laine, Ivoryton; Thomas P. Ricketts, Bozrah, all of Conn.

[73] Assignee: Northeast Utilities Service Company, Berlin, Conn.

[21] Appl. No.: 485,932

[22] Filed: Feb. 27, 1990

[51] Int. Cl.$^5$ .................. G01D 18/00; G12B 13/00
[52] U.S. Cl. .................. 250/252.1; 250/497.1; 250/506.1
[58] Field of Search .............. 250/252.1, 496.1, 497.1, 250/506.1

[56] References Cited

U.S. PATENT DOCUMENTS

| | | | |
|---|---|---|---|
| 2,820,905 | 6/1954 | Schloss | 250/388 |
| 2,945,129 | 7/1960 | Swift et al. | 250/252.1 |
| 3,107,299 | 10/1963 | Jachter | 250/252.1 |
| 3,657,541 | 4/1972 | Deutsch et al. | 250/252.1 |
| 4,069,423 | 1/1978 | Garrett | 250/493 |
| 4,152,600 | 5/1979 | Berry | 250/252.1 |
| 4,406,947 | 9/1983 | Burton et al. | 250/252.1 |
| 4,499,375 | 2/1985 | Jaszczak | 250/252.1 |
| 4,524,279 | 6/1985 | Christianson et al. | 250/497.1 |

*Primary Examiner*—Constantine Hannaher
*Assistant Examiner*—Edward J. Glick

[57] ABSTRACT

A portable dosimeter calibration device has a shielded container with a cover, and providing a cavity in which dosimeters may be spaced about a central shielded compartment. An elongated carrier rod has a radiation source adjacent its lower end and extends outwardly of the cover. The end of the rod with the radiation source is normally seated in a shielded well of the compartment in a first position of the rod, and the rod may be secured in a second elevated position in which it is aligned with a radiation passage in the shielding of the compartment to expose the dosimeter to radiation.

17 Claims, 4 Drawing Sheets

SOURCE RANGE FIELD CALIBRATION FIXTURE

BACKGROUND OF THE INVENTION

The present invention relates to radiation monitoring and, more particularly, to devices for calibrating radiation dosimeters.

The danger of exposure to radioactive sources has been known since the early days of this century. Madame Curie, joint discoverer with her husband of polonium and radium, was severely affected by the harmful radiation to which her research exposed her. It is known that solar radioactivity produces a low ambient level to which we are all exposed, and in regions where deposits of radioactive ores produce radon gas, we may be exposed to such gas which can accumulate in basements and closed spaces.

In nuclear research laboratories, on nuclear-powered ships, and in nuclear power plants, generally these are safe workplaces because of the scrupulous care in shielding design and in use of procedures which prevent exposure to radioactive sources. Occasionally, through accident or error, workers may be exposed to levels of radioactivity which may be dangerous. Since the personnel may not be aware of such exposure, it has long been standard procedure in such facilities to provide personal dosimeters for everyone to wear while at work. Each dosimeter is checked regularly to determine if the wearer has been exposed to a cumulative dosage which will require him to change jobs, or to undergo medical treatment.

Innovative forms of dosimeters include types which generate an alarm at a predetermined threshold, to warn the wearer to leave the area immediately. Regardless of their design, dosimeters require calibration to ensure that they remain accurate, since accuracy is synonomous with safety when dealing with the monitoring of radioactivity exposure.

Calibration of dosimeters was originally and is still largely done in laboratories which are remote from the facilities where the dosimeters are actually used. There has been a trend in recent years to calibrate the dosimeters on site, by using portable dosimeter calibrators. Such calibrators are typified by the structure in Jachter U.S. Pat. No. 3,107,299, the structure of which may briefly be summarized as follows. A holding jig, comprising a plurality of uniformly spaced retaining fixtures for dosimeters, is supported on a turntable driven by a precision motor controlled by a precision clock or clocks. A calibrated radiation source, enclosed within a shielded housing with a separately shielded, closable aperture, is located at a fixed position on the periphery of the turntable. In operation, the aperture shield is automatically moved aside during a timed exposure period, while the dosimeters are slowly moved past the aperture by the turntable, each dosimeter in turn facing the source at least once, and typically during several passes, to accumulate a known amount of radiation exposure. A hinged cover provides access to the interior for inserting and removing dosimeters. The shielding for the devices is comprised of layers, each layer being adapted to capture a different type of radiation.

A simple way of determining the dosage accumulated during a calibrating exposure period is to place in one of the retaining fixtures a reference dosimeter, recently calibrated by its manufacturer. The dosage recorded as accumulated on that reference dosimeter during the calibration period, can then be compared with the readings of each of the other dosimeters, to determine the appropriate calibration factor for each of those. This method is useful for all types of calibrators.

A major drawback of the design of the Jachter patent is that the radioactive source is located at the periphery of the turntable, and that its surrounding shielding makes its pattern of radiation quite directive. Therefore, the radiation it emits is most intense at the aperture of its shield and less intense at other points within the enclosure. This intensity depends on the point's distance from, and angle with respect to, the source. Dosimeters calibrators based on this design and its derivatives are relatively complex and costly.

Among the advantages of portable calibration units is that they could be used to do periodic calibrations when a dosimeter is turned in after an individual's work day, and thus to have the dosimeter ready for use the next day. When dosimeters are sent off-site for calibration, several days may elapse before they are returned. During that period, the worker must be provided with another dosimeter. When the original dosimeter returns, the radiation exposure during the intervening period, which was recorded on the spare dosimeter, must be entered in a logbook or data record for subsequent addition to the dosage accumulated on the primary dosimeter. Not only is such a process complex and susceptible to error, but also it is inappropriate for dosimeters which are designed to sound an alarm when a preset dosage threshold has been reached, since the dosimeter would have to be incremented by the dosage recorded on the spare dosimeter.

Alternatively, a spare dosimeter may be used to replace the primary dosimeter until the next calibration. This poses its own set of problems; it either doubles the number of dosimeters needed if each worker is assigned a primary unit and a spare, or, if a limited number of spares are used for the entire workforce, it necessitates a complex system of bookkeeping with a potential for error.

It is an object of the present invention to provide a novel portable dosimeter calibration device which may be used on-site at nuclear facilities.

Another object is to provide such a calibration device which is small, lightweight and relatively inexpensive to fabricate.

It is also an object to provide such a calibrator which is simple to use and which enables the user to avoid the complexities of record keeping, and the expense and inconvenience of sending dosimeters elsewhere for calibration.

SUMMARY OF THE INVENTION

It has now been found that the foregoing and related objects may be readily attained in a dosimeter radiation calibration device having an enclosure including a base wall and a sidewall providing an upwardly opening cavity and shielding thereabout, and a removable cover for the enclosure and cavity. A shielded compartment is located centrally of the cavity, and it provides a vertically extending central well at the base, a passage extending horizontally substantially through the shielding above the well, and shielding above the passage.

Supported within the compartment and extending outwardly of the cover is a radiation source carrier rod having means for carrying a radiation source adjacent its lower end. The carrying means is disposed within the well in a first position of the rod, and the carrier rod is axially movable within the compartment. Dosimeter support means is provided in the cavity about the compartment in alignment with the passage, and positioning means is provided for selectively positioning the carrier rod in the first position and in a second position in which the carrying means thereon is aligned with the passage. In the second position dosimeters supported on the support means may be exposed to radiation passing through the passage of the compartment.

In the preferred embodiments, the compartment includes a guide tube slidably seating the carrier rod, and upper and lower shielding elements about the guide tube and vertically spaced to provide the passage and with the lower shielding element providing the well. The compartment also includes a tubular element in which the shielding elements and guide tube are disposed.

Desirably, the calibration device includes releasable means engaged with the rod to limit its axial movement, which is conveniently provided by a stop member extending through the guide tube and seated in an axial slot in the carrier rod.

Preferably, the positioning means includes a pair of vertically spaced apertures in the rod and a positioning pin selectively engageable in the apertures to secure the rod in the first and second positions. The enclosure includes a tubular shielding element disposed adjacent its sidewall, and the support means is provided upon a base member seated on the base wall of the enclosure.

DETAILED DESCRIPTION OF PREFERRED EMBODIMENT OF THE INVENTION

Figure 1:
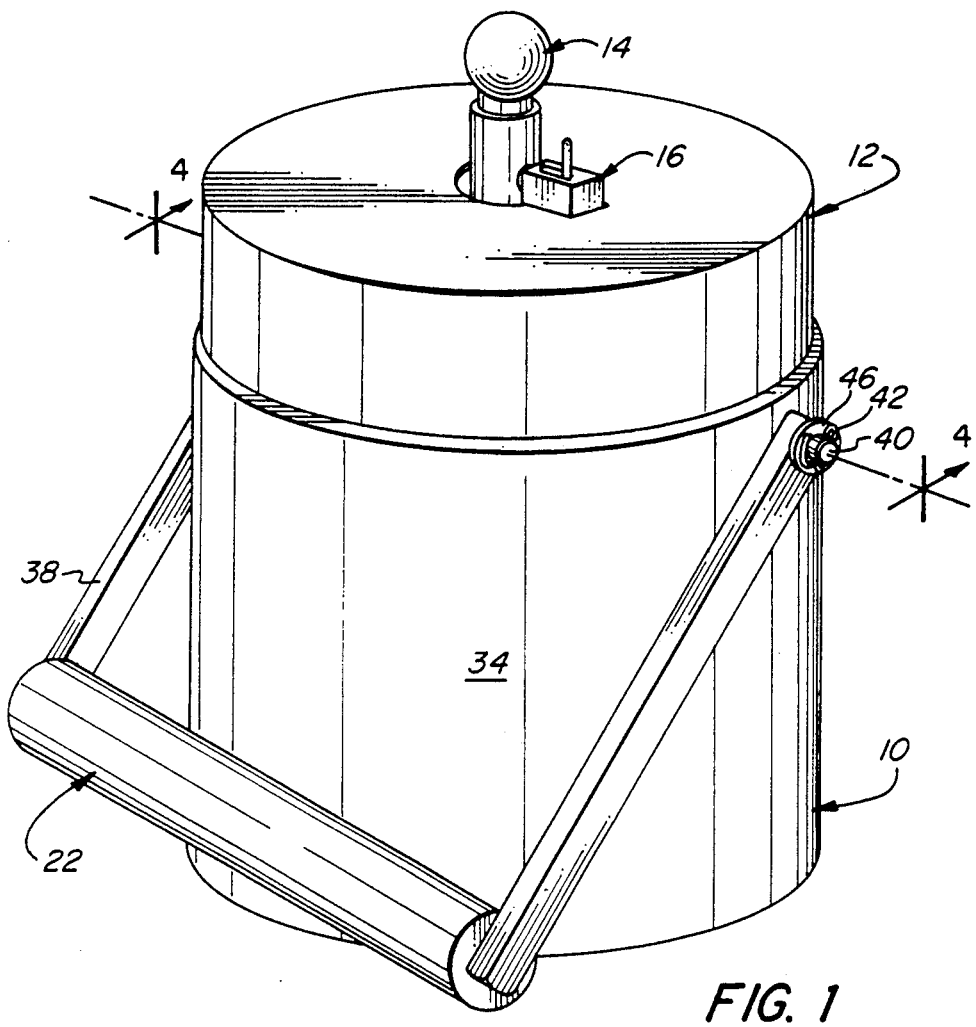
FIG. 1 is a perspective view of a dosimeter calibrator embodying our new design.

Turning first to FIG. 1, the dosimeter calibrator is shown in perspective and is generally comprised of a receptacle generally designated by the numeral 10, the removable cover generally designated by the numeral 12, the vertically movable source carrier rod generally designated by the numeral 14, and the radiation source carrier rod locking and positioning assembly generally designated by the numeral 16. Also shown is the pivotable handle 22 which is mounted upon the receptacle 10.

Figure 2:
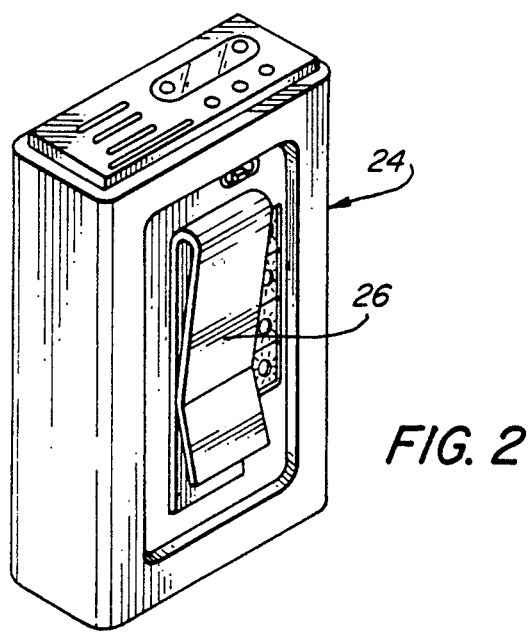
FIG. 2 is a perspective view of a typical dosimeter to be calibrated therein.

In FIG. 2, there is illustrated a conventional dosimeter generally designated by the numeral 24 and having a spring clip 26 to permit attachment to a pocket, belt or the like.

In FIG. 1, the locking pin 32 has been slid back to its remote position, withdrawing the pin from a locking aperture (not shown in FIG. 1) in the carrier rod 14, thus permitting the cover 12 to be removed.

As seen in FIG. 1, the carrier rod 14 is in its DOWN (radioactive source-shielding) position, which is the normal position to which it falls whenever the locking pin 32 is withdrawn from a positioning aperture (not shown in FIG. 1) in the rod 14 which will hold it in a raised position. Thus, the carrier rod 14 can only remain in its UP (radioactive source-exposing) position if the locking pin 32 is inserted into the positioning aperture after the carrier rod 14 has been raised. In order to insert the locking pin 32 into the positioning aperture, the cover 12 must be in place as will be described more fully hereinafter.

Figure 3:
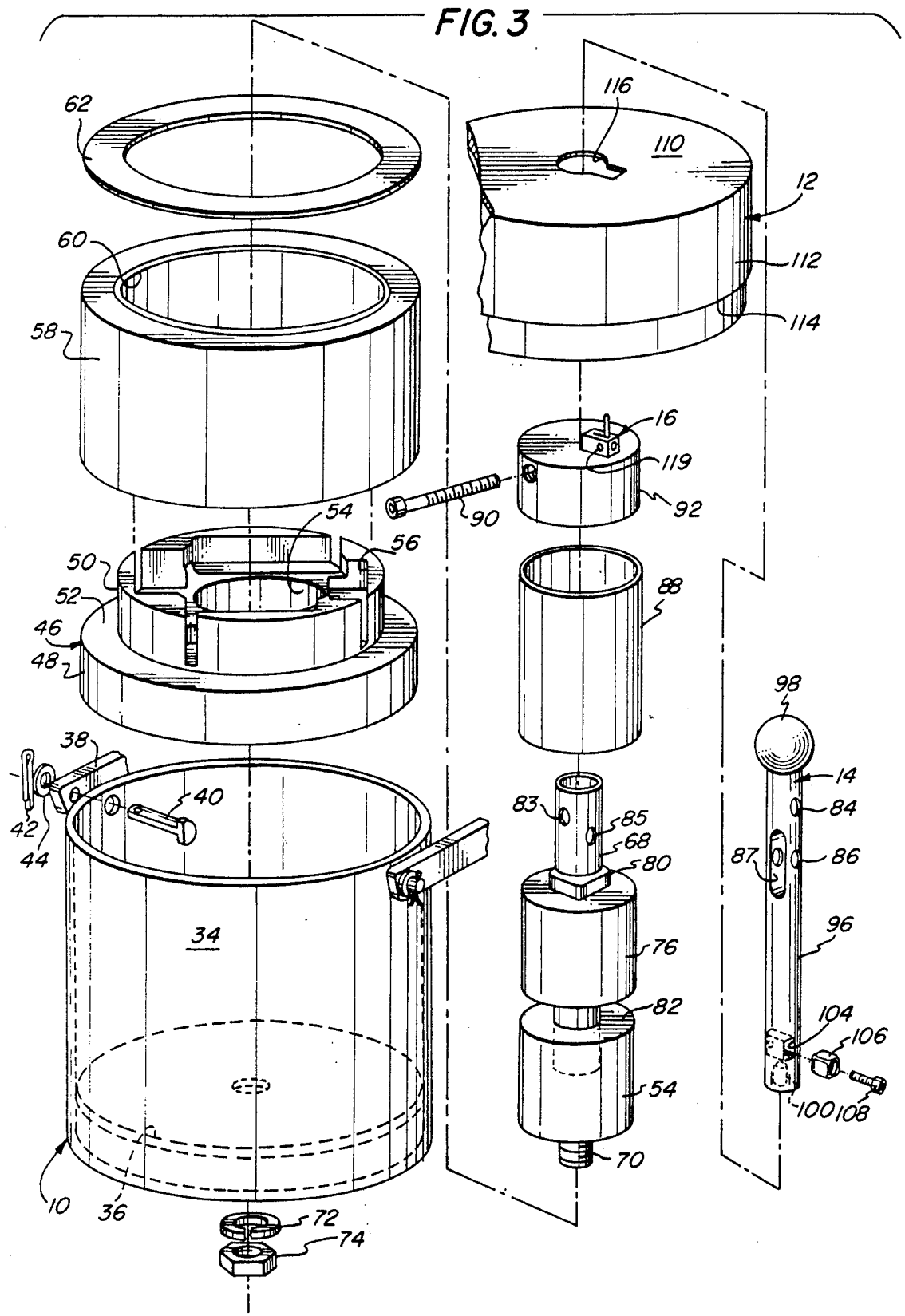
FIG. 3 is a partially exploded view of the dosimeter calibrator of FIG. 1.
Figure 4:
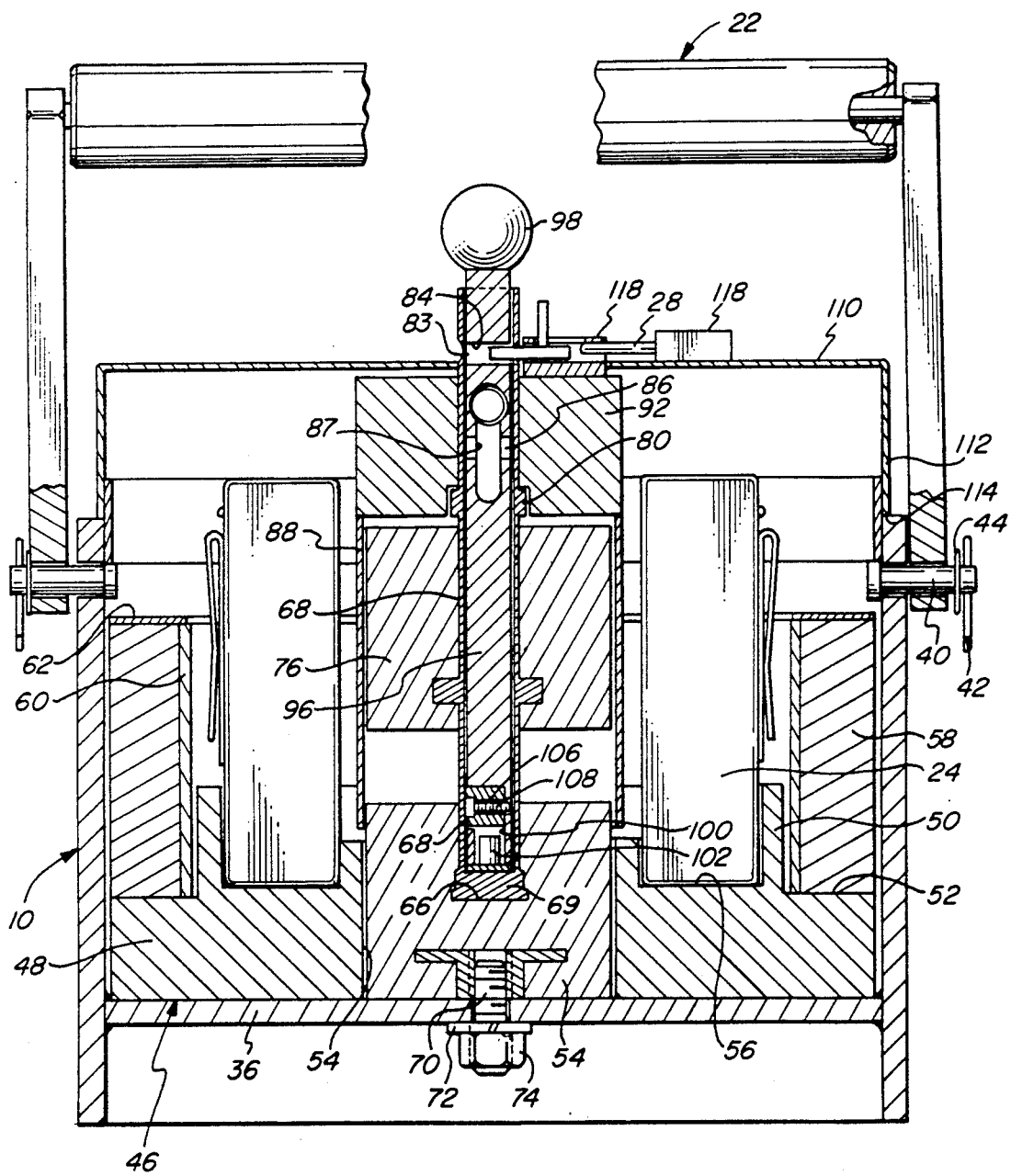
FIG. 4 is a cross sectional view of the dosimeter calibrator along the line 4—4 of FIG. 1, with two dosimeters in their respective holders, and with the radioactive source shield in its DOWN position, so that the radioactive source remains in a shielded well.

Turning now to FIGS. 3 and 4, the receptacle 10 has a cylindrical sidewall 34 and a base wall 36 spaced upwardly from the bottom edge of the sidewall 34. The arms 38 of the handle 22 are pivotably secured thereto by the pivot pins 40 which are in turn retained by the cotter pin 42 and a washer 44. Seated on the base wall 36 is a dosimeter holder generally designated by the numeral 46 and which has a large diameter base portion 48 and a smaller diameter pedestal portion 50 providing a radially extending shoulder 52 thereabout. An axial bore 54 extends through the holder 46, and the pedestal portion 50 is configured to provide four recesses 56 for seating the dosimeters 24.

Seated on the shoulder 52 of the holder 46 is the outer lead shield 58 of tubular configuration and it is provided with a brass liner 60 and a top cover ring 62.

Disposed in the bore 54 of the holder 46 is the lower end of lead base shield 54 of circular cross section and which has a circular recess 66 in its top surface which seats the lower end of the carrier rod guide tube 68 and its end cap 69. Threadably engaging in the lower surface of the base shield 54 is the threaded fastener 70 which passes through an aperture in the base wall 36 and which is locked thereto by the lock washer 72 and nut 74.

Spaced above the lead base shield 64 about the guide tube 68 is the lead upper shield 76 of annular configuration, and it is held in position on the rod guide tube 68 by the key 78 intermediate its axial length. As a result of the spacing between the shields 54, 76 there is an annular recess 82 about the rod guide tube 68.

At the upper end of the guide tube 68 and secured by the key 80 is the annular center cap 92 which has the locking and positioning assembly 16 on its upper surface.

The upper end of the rod guide tube 68 has a pair of apertures 83, 85 spaced both axially and 90° about its circumference, and the screw 90 extends through the cap 92 and the aperture 85.

The carrier rod 14 also has an axially elongated slot 87 extending transversely therethrough and into which extends the screw 90 to limit axial movement of the rod 14 within the guide tube 68. The carrier rod 14 also has a locking aperture 84 and a positioning aperture 86 which are alignable with the aperture 83 in the guide tube 68 and locking pin 32.

Disposed about the lead base shield 64 and lead upper shield 76 is a thin walled tubular lead shield 88 which seats on the top surface of the dosimeter holder 46 and which encircles the annular recess 82.

Slidably seated in the rod guide tube 68 is the elongated cylindrical body portion 96 of the carrier rod 14, and it is conveniently movable vertically therein by gripping the ball knob 98 at its upper end. Adjacent its lower end the rod 14 has a cavity 100 in which is seated the radiation source 102. To enable placement of the source 102 in the cavity 100, and removal therefrom, the rod 14 has an access aperture 104 thereabove which is sealed by the stop plug 106 and screw 108

The cover 12 has a top wall 110 and a stepped sidewall 112 providing a peripheral shoulder 114 which seats on the upper end of the sidewall 34 of the receptacle 10. In the center of the top wall 110 is an aperture 116 configured and dimensioned to allow the ball knob 98 to pass therethrough and allow the positioning assembly 16 to extend therethrough.

As previously indicated the locking and positioning assembly 16 is supported on the top surface of the center cap 92. The assembly 16 has a housing 118 in which is seated the locking pin 32, and its upper wall has an elongated slot through which extends the grip 120 for the pin 32.

Figure 5:
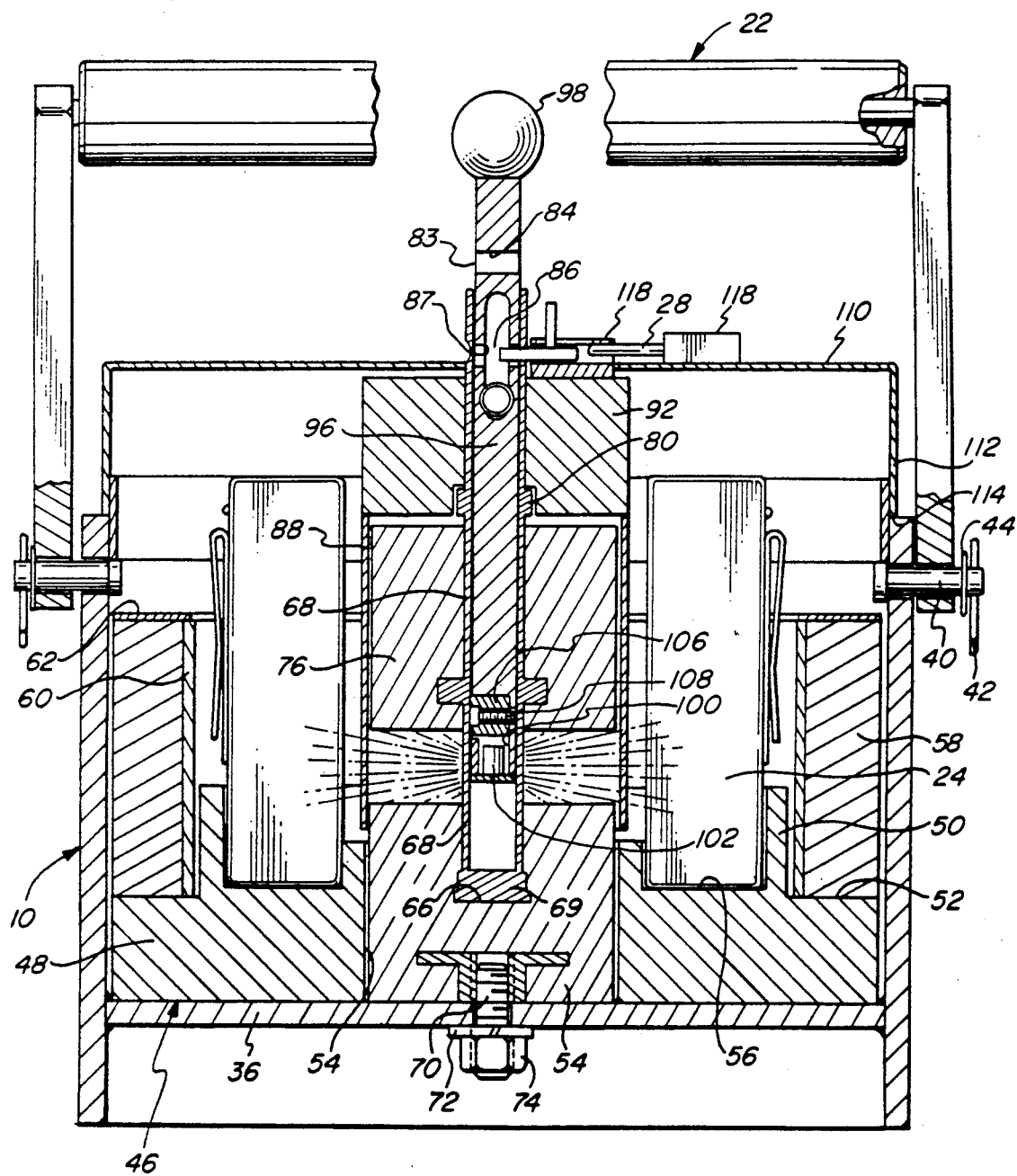
FIG. 5 is a similar cross sectional view of the dosimeter calibrator with the radioactive source shield in its UP position, and diagrammatically indicating the pattern of irradiation.

In the preferred embodiments and as illustrated in FIGS. 4 and 5, the housing 118 has apertures 119 in its sidewalls through which the shackle 28 of a padlock 18 extends to prevent the locking pin 32 from being moved from its rod engaging position and to preclude removal of the cover 12.

The positioning apertures 86 and 84 serve as locking points for the carrier rod 14 in its DOWN and UP positions, respectively. The slot 87 in conjunction with the screw 90 which extends through it, serves two purposes: one purpose is to limit the upward and downward travel of the carrier rod 14, so that, at both the top and bottom of the travel, locking pin 32 faces a pin position aperture (84 or 86) into which it can be inserted to lock the source rod 14 at its UP or its DOWN position. The other purpose is to prevent the unintended, complete removal of the source rod 14 from its shielding structure. This is effected by the screw 90 which acts as a capturing device when it engages the bottom of the slot 87, as the source rod 14 is pulled up to its topmost position by ball knob 98.

As indicated earlier, the source rod 14 can be kept in the UP position only if position locking pin 32 is inserted into the positioning aperture 86. Operating procedures for use of the dosimeter calibrator require the user to secure the locking pin 32 in place by inserting the shackle 28 of the padlock 18 into aperture 84 and snapping the padlock 18 shut. This prevents tampering, and it ensures that the dosimeters are irradiated for their intended, full period of exposure.

In use of the calibration device, the padlock 18 is removed and the cover 12 is lifted from the receptacle 10. The dosimeters 24 are placed in the recesses 56 of the holder 46, and the cover 12 is then replaced. The carrier rod 14 is then lifted to orient the aperture 88 in alignment with the locking pin 32 which is then inserted thereinto to position the rod 14 with the source 102 disposed in alignment with the recess 82. In this position, its radiation penetrates the thin wall of the hollowed bottom of the carrier rod 14, the thin wall of the rod guide tube 68, and the thin wall of tubular lead shield 88 to irradiate the dosimeters 24, one of which might typically be a reference dosimeter.

It is apparent that this arrangement of the shields 64 and 76 restricts radiation to the region originating at source 102, bounded below and above by the shields 64 and 76, and terminating at the outer shield 58 which is disposed behind the dosimeters 24. The source 102 emits radiation isotropically, but the zone of effective irradiation is a disk centered at source 102, extending through recess 83, and widening radially outwardly as illustrated in FIG. 5. However, as seen in FIG. 4, when the source rod 14 is in its DOWN position, the source 102 remains in the shielding well formed by the base lead shield 64.

As also seen in FIG. 5, the radiation emanating upwardly from source 102 is shielded by the source stop plug 106 and by the metal of the source rod 14 that lies between the access apertures 104 and the slot 87. Clearly, if desired, the upper section of the source rod 14 can be filled with, or formed from lead. Radiation emanating downwardly is shielded by the base shield 64.

In assembling the calibration device, the dosimeter holder 46 is placed in the receptacle 10 and the subassembly of rod guide tube 68, shields 64 and 76, and cap 80 is inserted into the bore 54, and the fastener 70 extends through the aperture in the base wall 36. The lock washer 72 and nut 74 are then placed on the fastener 70 to lock the subassembly in position.

The inner lead tubular shield 88 is now slipped over the subassembly so that the bottom edge of the shield 88 rests on the surface of the holder 46. The center cap 92 is now placed on top of the tubular shield 88, so that the rod guide tube 68 extends upwardly therethrough.

The outer lead shield 58 is placed on the holder 46 and the cover ring 62 is placed thereon. Lastly, the cover 12 is placed thereon. At this point, the carrier rod 14 may be inserted therein without the radiation source 102.

As will be appreciated, the radioactive source is not an integral part of the dosimeter calibrator as manufactured. For reasons of safety in storage and handling, it is the user's responsibility to provide the source and to insert it after the dosimeter calibrator has been delivered to the user's facility. Any suitable source which can be inserted into access aperture 104 can be used. One typical source is a Cesium 137 gamma ray source of 20 microCuries intensity.

When it is desired to place the calibrator in use, the carrier rod 14 has to be loaded with a suitable source of radioactive material, using suitable precautions, including remote manipulators where appropriate. Using similar handling precautions, carrier rod 14 is now inserted into the rod guide tube 68, until it comes to rest on the end cap 69. The screw 90 is now screwed into the cap 80 and tube 68 so that it seats in the slot 87, thus capturing the carrier rod 14.

The cover 12 may now be put on, and position locking pin 32 slid into the aperture 86. The shackle 28 of the padlock 18 may be locked on the positioning assembly 16. The dosimeter calibrator is stored in this locked condition between uses, the key to the padlock being kept by the person trained in its use and authorized to do dosimeter calibrations.

When a calibration is to be performed, the padlock 18 is unlocked and its shackle 28 removed from the positioning assembly 16.

The dosimeters 24 to be calibrated are then inserted in recesses 56 and the cover 12 is replaced. It should be noted that the rod 14 has remained in its DOWN position during this loading and the 102 has been located inside the well of lead base shield 64. The carrier rod 14 may now be raised to its UP position by lifting the ball knob 98, and the position locking pin 32 is slid into aperture 88. The exposure timing period has now started. The shackle 28 of the padlock 18 may be slipped through the positioning assembly 16 and snapped shut to prevent tampering during the exposure period.

When the desired exposure period ends, the padlock 18 may be unlocked and removed and the locking pin 32 slid from aperture 88 permitting the carrier rod 14 to fall to its DOWN position in which the source 102 is shielded. The cover 12 may now be safely removed and the dosimeters 24 taken from their recesses. Thus, it can be seen that the design of the dosimeter calibrator is inherently safe and essentially simple to use.

As is also evident from the illustrations and this description, the dosimeters are equidistantly positioned from the radiation source, and therefore are equally irradiated. This obviates any need for such costly and complex devices as turntables, gear drives, precision motors and the like. The result is a reduction in manufacturing cost and simplicity of maintenance. Facilities which have such dosimeter calibrators can eliminate the expense, complexity and possible compromise of safety which are involved when dosimeters are sent off-site for calibration.

Alternatives to the illustrated embodiment will be apparent to those skilled in the art. The cannister may be enlarged to provide recesses for more dosimeters; spring loading on the position locking pin may be used to provide a positive engagement force for inserting the pin in the positioning apertures. Moreover, spring loading may be provided on the rod to provide additional downward force in seating the source within the shielding well.

Thus, it can be seen from the foregoing detailed description and attached drawings that the calibrator of the present invention is relatively simple and economical to fabricate and reliable and durable. It is simple to use and eliminates the necessity for off premises calibration.

Having thus described the invention, what is claimed is:

1. A dosimeter radiation calibration device comprising:
   (a) an enclosure including a base wall and sidewall providing an upwardly opening cavity and shielding thereabout;
   (b) a removable cover for said enclosure and cavity;
   (c) a shielded compartment centrally of said cavity, said compartment providing a central well at the base thereof extending vertically therein, a passage extending horizontally substantially through said shielding above said well, and shielding above said passage;
   (d) a radiation source carrier rod having means for carrying a radiation source adjacent its lower end, and having its upper end extending outwardly of said cover, said carrying means being disposed within said well in a first position of said rod, said carrier rod being axially movable within said compartment;
   (e) dosimeter support means in said cavity about said compartment in alignment with said passage; and
   (f) positioning means for selectively positioning said carrier rod in said first position and in a second position in which said carrying means thereon is aligned with said passage whereby dosimeters supported on said support means may be exposed to radiation passing through said passage of said compartment.

2. The calibration device in accordance with claim 1 wherein said compartment includes a guide tube slidably seating said carrier rod.

3. The calibration device in accordance with claim 2 wherein said compartment includes upper and lower shielding elements about said guide tube and vertically spaced to provide said passage, said lower shielding element providing said well.

4. The calibration device in accordance with claim 3 wherein said compartment includes a tubular element in which said shielding elements and guide tube are disposed.

5. The calibration device in accordance with claim 1 wherein said calibration device includes releasable means engaged with said rod to limit its axial movement.

6. The calibration device in accordance with claim 5 wherein said compartment includes a guide tube slidably receiving said carrier rod and said releasable means includes a stop member extending through said guide tube and seated in an axial slot in said carrier rod.

7. The calibration device in accordance with claim 1 wherein said positioning means includes a pair of vertically spaced apertures in said rod and a positioning pin engageable in said apertures to secure said rod in said first and second positions.

8. The calibration device in accordance with claim 1 wherein said enclosure includes a tubular shielding element disposed adjacent said sidewall thereof.

9. The calibration device in accordance with claim 1 wherein said support means is provided upon a base member seated on said base wall of said enclosure.

10. A dosimeter radiation calibration device comprising:
    (a) an enclosure including a base wall and sidewall providing an upwardly opening cavity and shielding thereabout;
    (b) a removable cover for said enclosure and cavity;
    (c) a shielded compartment centrally of said cavity, said compartment providing a central well at the base thereof extending vertically therein, a passage extending horizontally substantially through said shielding above said well, and shielding above said passage;
    (d) a radiation source carrier rod having means for carrying a radiation source adjacent its lower end, and having its upper end extending outwardly of said cover, said carrying means being disposed within said well in a first position of said rod, said compartment including a guide tube and said carrier rod being axially movable within said guide tube;
    (e) dosimeter support means in said cavity about said compartment in alignment with said passage;
    (f) positioning means for selectively positioning said carrier rod in said first position and in a second position in which said carrying means thereon is aligned with said passage whereby dosimeters supported on said support means may be exposed to radiation passing through said passage of said compartment; and
    (g) releasable means engaged with said rod to limit its axial movement, said releasable means including a stop member extending through said guide tube and seated in an axial slot in said carrier rod.

11. The calibration device in accordance with claim 10 wherein said positioning means includes a pair of vertically spaced apertures in said rod and a positioning pin engageable in said apertures to secure said rod in said first and second positions.

12. The calibration device in accordance with claim 10 wherein said enclosure includes a tubular shielding element disposed adjacent said sidewall thereof, said support means being provided upon a base member seated on said base wall of said enclosure.

13. The calibration device in accordance with claim 10 wherein said compartment includes upper and lower shielding elements about said guide tube and vertically spaced to provide said passage, said lower shielding element providing said well, said compartment also including a tubular element in which said shielding elements and guide tube are disposed.

14. A dosimeter radiation calibration device comprising:
   (a) an enclosure including a base wall and sidewall providing an upwardly opening cavity and shielding thereabout;
   (b) a removable cover for said enclosure and cavity;
   (c) a shielded compartment centrally of said cavity, said compartment having a vertically extending guide tube centrally thereof, said compartment providing a central well at the base thereof extending vertically therein, a passage extending horizontally substantially through said shielding above said well, and shielding above said passage, said compartment including upper and lower shielding elements about said guide tube and vertically spaced to provide said passage, said lower shielding element providing said well, said compartment also including a tubular element in which said shielding elements and guide tube are disposed;
   (d) a radiation source carrier rod having means for carrying a radiation source adjacent its lower end, said carrying means disposed within said well in a first position of said rod, said carrier rod being axially movable within said guide tube;
   (e) dosimeter support means in said cavity about said compartment in alignment with said passage;
   (f) positioning means for selectively positioning said carrier rod in said first position and in a second position in which said carrying means thereon is aligned with said passage whereby dosimeters supported on said dosimeter support means may be exposed to radiation passing through said passage of said compartment; and
   (g) releasable means engaged with said rod to limit its axial movement.

15. The calibration device in accordance with claim 14 wherein said releasable means includes a stop member extending through said guide tube and seated in an axial slot in said carrier rod.

16. The calibration device in accordance with claim 14 wherein said positioning means includes a pair of vertically spaced apertures in said rod and a positioning pin engageable in said apertures to secure said rod in said first and second positions.

17. The calibration device in accordance with claim 14 wherein said enclosure includes a tubular shielding element disposed adjacent said sidewall thereof, and said support means is provided upon a base member seated on said base wall of said enclosure.

* * * * *